Aug. 11, 1953

C. M. VITZ 2,648,421

UNLOADING CONVEYER

Filed Aug. 22, 1951

INVENTOR.
Carl M. Vitz
BY
Otto Moeller
Attorney

Aug. 11, 1953 — C. M. VITZ — 2,648,421
UNLOADING CONVEYER

Filed Aug. 22, 1951 — 3 Sheets-Sheet 2

*INVENTOR.*
Carl M. Vitz
BY
*Otto Moeller*
Attorney

Aug. 11, 1953　　　　C. M. VITZ　　　　2,648,421
UNLOADING CONVEYER
Filed Aug. 22, 1951　　　　　　　　　　3 Sheets-Sheet 3
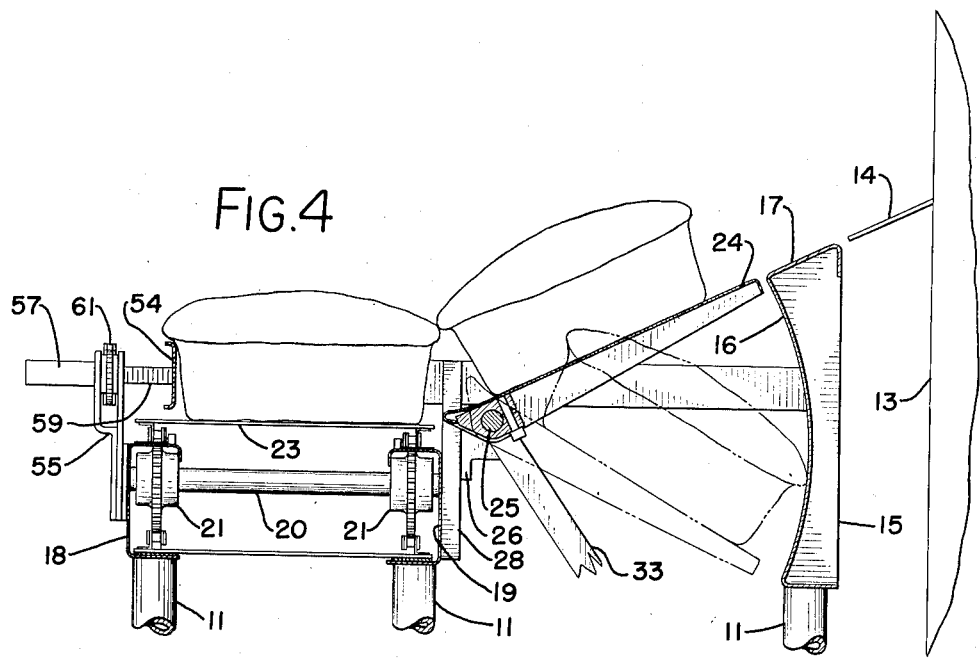
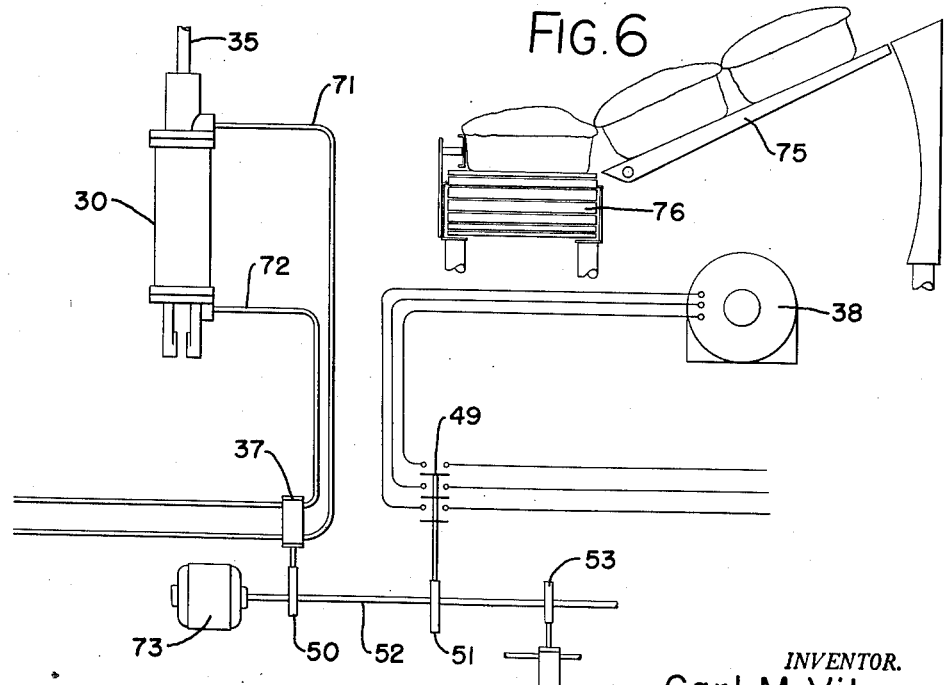
INVENTOR.
Carl M. Vitz
BY
Otto Moeller
Attorney Patented Aug. 11, 1953

2,648,421

UNITED STATES PATENT OFFICE 2,648,421

UNLOADING CONVEYER

Carl M. Vitz, York, Pa., assignor to Read Standard Corporation, New York, N. Y., a corporation of Delaware Application August 22, 1951, Serial No. 243,043

3 Claims. (Cl. 198—32)

My invention relates in general to apparatus for distributing and conveying articles and, more particularly, to an apparatus which receives from an adjoining piece of equipment multiple rows of articles and separates the rows into a single continuous line. Since the invention is particularly applicable to and was originally embodied in an apparatus arranged to receive loaves of bread from a bread cooling and conditioning device in a double row and that automatically separated the double row and conveyed the bread away in a single continuous line, the invention is so shown in the drawings and so described hereinafter for purpose of illustration.

In one very successful type of bread conditioner and cooler, the hot loaves of baked bread are conveyed through a tempering or conditioning tunnel in successive rows, each row consisting, for example, of ten loaves abreast. From the tempering or conditioning tunnel, two rows of loaves of bread at a time are admitted to a vacuum chamber where cooling and conditioning is completed, and from which the double row of loaves is then discharged. It is desirable to convey the loaves of bread from the cooling and conditioning unit in a single continuous line, so that they can be delivered in this fashion to a slicing and wrapping unit for example.

In view of the foregoing, a primary object of the invention is to provide an apparatus to which successive multiple rows of loaves of bread are delivered and that automatically rearranges the rows into and conveys them off in a single continuous file.

The invention includes an endless conveyer operating in a horizontal path and a platform pivotally mounted along and adjacent one side of the conveyer for oscillating movement between an upwardly sloping position pitched at an angle to permit rows of products to travel thereacross by gravity and to a position precluding such travel. An important feature of the invention is the provision and arrangement of means whereby one row at a time is delivered onto the conveyer, the break between successive rows coinciding substantially with the space between the adjacent sides of the platform and conveyer.

Another feature of the invention resides in the arrangement whereby the conveyer remains stationary while a row of products is delivered thereon from the platform, and operates to carry off the deposited row in a single continuous file, while the platform is in its lowered position.

Still another important feature of the invention resides in the arrangement whereby the conveyer in carrying off a row of products travels through a distance equal to the width of a row of products, whereupon it automatically stops to receive another row of products.

Other features of the invention will become apparent from the following description when read in connection with the accompanying drawings, in which Figure 1 is a plan view of invention;

Figure 4 is a sectional view taken on the line 4—4 of Figure 1;

Figure 5 is a diagrammatic view of the operating and control means forming part of the invention; and Figure 6 is a diagrammatic view of a modified form of the invention showing an arrangement for handling three contiguous rows of products.

Figure 1:
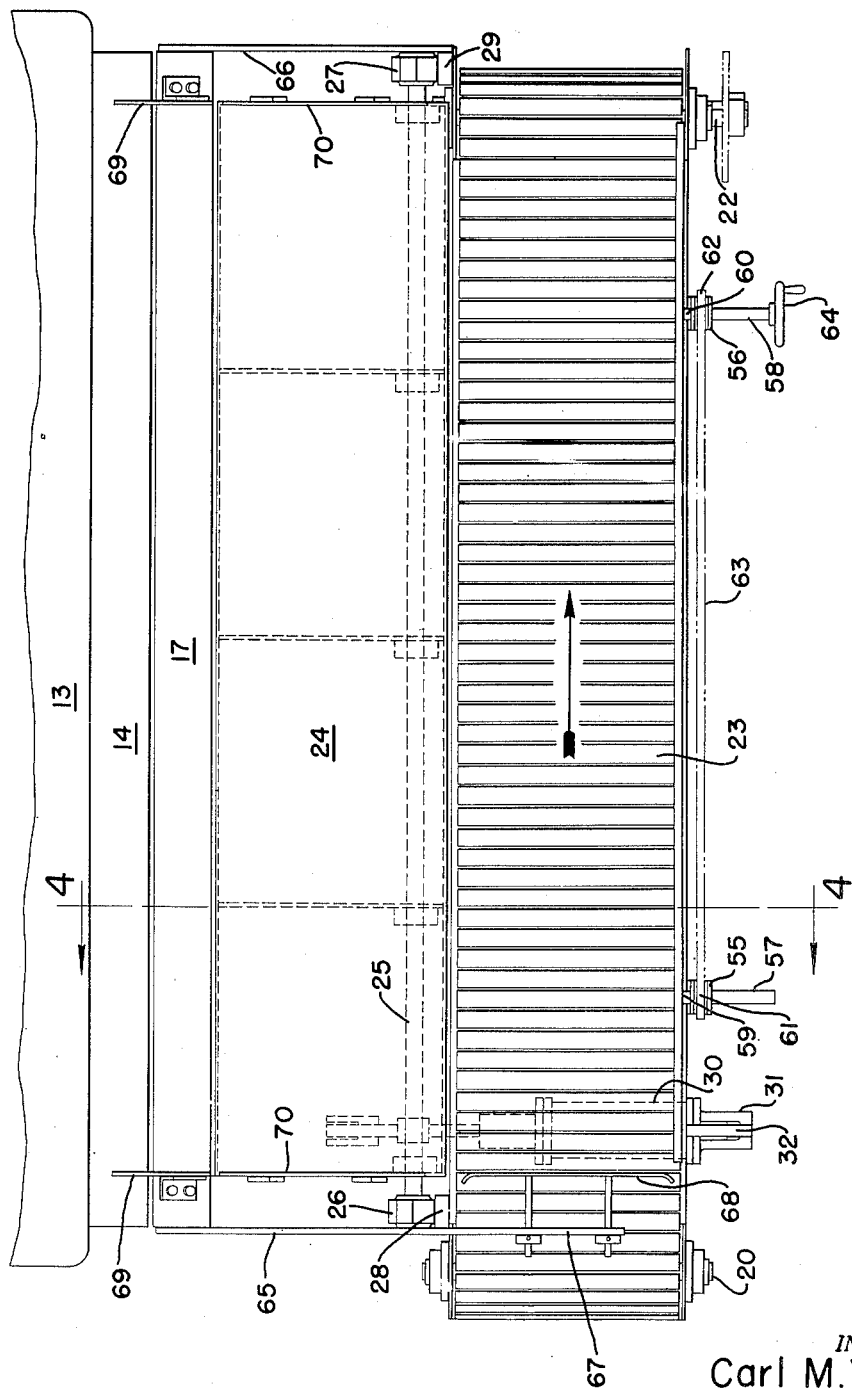

Referring to the drawings, the bread distributing and conveying apparatus constituting my invention includes a base frame 10 of substantially rectangular shape formed by a number of legs 11 suitably tied together by frame members 12. The distributing and conveying apparatus with its base frame 10 is disposed with one of its longer sides, which will be referred to hereinafter as the rearward side, adjacent the delivery or discharge end of an adjoining piece of equipment, as for example, a bread cooler and conditioner 13 from which double rows of bread are intermittently discharged across its downwardly sloping, transversely extending apron 14. The bread cooler and conditioner forms no part of the present invention and is therefore only fragmentarily and diagrammatically shown and need not be described in any detail.

The said rearward side of the distributing and conveying apparatus is provided with a transversely extending skirt 15 suitably secured to and supported on the base frame 10. The front face 16 of the skirt 15 is arcuately concaved for a purpose which will be explained further on in the description. The skirt 15 is also provided with a transversely extending shelf 17 sloping upwardly and rearwardly from the upper edge of the front face 16 and arranged in alinement with and closely adjacent the sloping apron 14 of the bread cooler and conditioner 13.

At the side of the distributing and conveying apparatus opposite the skirt 15, i. e., the forward side, is an upright transversely extending frame member 18 supported on the base frame 10. Between the frame member 18 and the skirt 15 is a second upright transversely extending frame member 19 also supported on the base frame 10.

Journaled in and extending between the frame members 18 and 19 at one extreme end thereof is a shaft 20 carrying the sprockets 21. Journaled in and extending between the frame members 18 and 19 at the opposite extreme end thereof is a shaft 22 carrying sprockets (not shown) similar to the sprockets 21. Trained around the sprockets 21 on shaft 20 and the similar sprockets on shaft 22 is a slat type endless conveyor 23. In the arrangement illustrated in the drawings the conveyor 23 is operated with the top run moving in the direction of the arrow in Figure 1, whereby the loaves of bread will be carried off to the right. From the conveyor 23, the loaves are delivered onto another conveyor (not shown) whereby the loaves in a continuous single file may be delivered to a slicer-wrapper machine. It will be obvious from the following description that if it is desired to carry the loaves off to the left, this may be done with very little alteration.

The top run of the endless conveyor 23 is at substantially lower level than the shelf 17 of the skirt 15 and the space therebetween is bridged by a pivotally mounted platform or tray 24, whereby loaves of bread may slide by gravity from the shelf 17 onto the endless conveyor 23, when the platform 24 is in the position shown in full lines in Figure 4. The platform 24 is secured at its end adjacent the upper run of the conveyor 23 on a transversely extending shaft 25. At its opposite ends, the shaft 25 is journaled in bearings 26 and 27 carried respectively by upright frame members 28 and 29, which in turn are secured to the frame member 19.

The platform 24 is oscillated between its up position as shown in full lines in Figure 4 and its down position as shown in dot and dash lines in the same figure by means of an air cylinder 30. In its up position, the platform 24 is preferably disposed at an upward angle of about 30° and in its down position at a downward angle of about 30°. It will be apparent that the downward travel of the platform 24 need only be such that products will not slide forwardly thereacross by gravity. It is preferred to move the platform to a downwardly sloping angle of about 30°, so that the row of products will slide rearwardly thereon, in order that, upon the platform being again moved to its up position, the row of products can gain sufficient impetus to insure delivery onto the conveyor 23. The curved front face 16 of the skirt 15 which follows closely the path of travel of the free end of the platform 24 forms a stop means for retaining the row of products on the platform 24.

Figure 2:
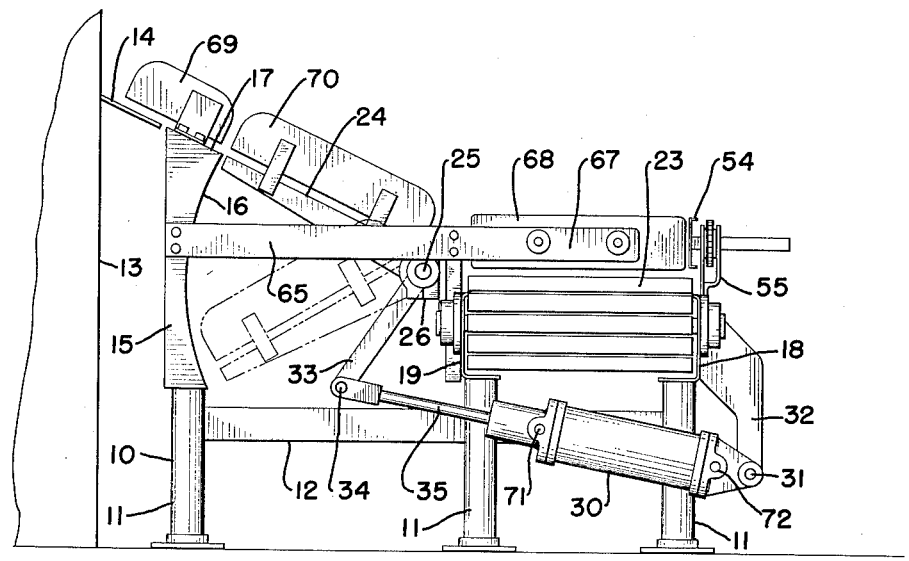
Figure 2 is an end elevation of the structure shown in Figure 1 as viewed from the left.
Figure 3:
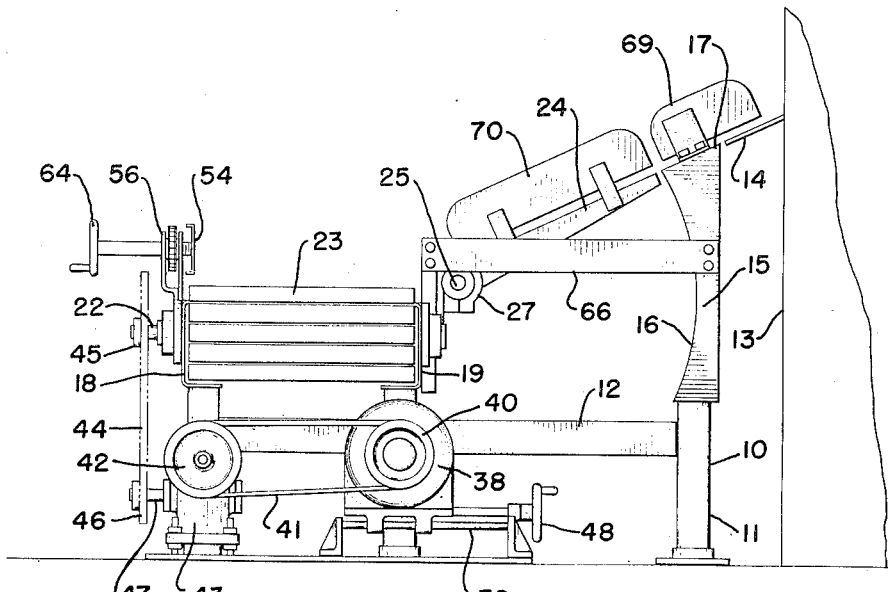
Figure 3 is an end elevation of the structure shown in Figure 1 as viewed from the right.

The air cylinder 30 is pivotally mounted at one end, as shown at 31 in Figure 2, on a bracket 32 which is rigidly secured to the frame member 18. A lever arm 33 is keyed or otherwise secured at one end to rotate with the platform shaft 25 and at its free end has a pivotal connection 34 with the free end of the piston rod 35 of the air cylinder 30. Air is admitted to one end or the other of the air cylinder 30 through flexible lines 71 and 72, in which lines is interposed a cam operated valve 37 for controlling passage of air through one or the other of said lines 71 and 72.

The endless conveyor 23 is operated by a motor 38 adjustably mounted on the base 39. A variable pitch pulley 40 is mounted on the motor shaft and a belt 41 operatively connects the pulley 40 with the pulley 42 mounted on the shaft of a speed reducer 43. A sprocket chain 44 trained over sprockets 45 and 46 mounted respectively on the conveyor shaft 22 and the speed reducer shaft 47 transmits power for operating the endless conveyor 23. A handwheel 48 is provided for adjusting the motor 38 on the base 39 for varying the rate of travel of the endless conveyor 23. Operation of the motor 38 for the conveyor 23 is controlled by a cam operated switch 49, Figure 5.

Cam 50 controlling the valve 37 and cam 51 controlling the switch 49 are mounted on the same shaft 52 of a motor 73, for coordinating the operation of the platform 24 and conveyor 23 in a manner hereinafter described. On the same shaft 52 is a cam 53 that controls release of a double row of loaves of bread at timed intervals from the bread conditioner and cooler 13.

In operation, assuming the cam 53 has operated to effect release of a double row of bread, which slide by gravity to the position shown in Figure 4. An interval after operation of cam 53, sufficient to permit the double row of loaves to reach the position shown in Figure 4, the cam 50 operates the air valve 37 to admit air to the front of the cylinder 30 whereupon the pivoted platform 24 will move to its down position carrying the second row of loaves with it as shown in dot and dash lines in Figure 4. At the same time, cam 51 operates to close the switch 49 thereby starting motor 38 and effecting operation of the conveyor 23 which carries off the first row of loaves.

The rate of travel of the conveyor 23 through the speed reducer 43, and the configuration of the cam 51 are so related that immediately upon the first row of loaves being carried off a distance to clear the second row, the cam 51 stops the motor 38 and conveyor 23, and the cam 50 functions to reverse the flow of air to the cylinder 30, whereupon the platform 24 reassumes its up position. In the up position of the platform 24, the second row of loaves is free to slide by gravity onto the conveyor 23. The cams 50 and 51 are so configured to thereupon again start the conveyor motor 38 and operate the air cylinder to move the platform 24 to its down position; and, to stop the conveyor motor 38 when the second row of loaves has been carried off and simultaneously move the platform 24 back to its up position. This completes the cycle of operation, and a new cycle begins when the cam 53 functions to release another double row of loaves from the conditioner and cooler 13.

A bread stop plate 54 is disposed along one side of the endless conveyor 23 which is adjustable to suit the length of bread loaves being handled. The stop plate 54 is so positioned that the break between the two rows of loaves will fall on or coincide with the gap between the adjacent edges of the conveyor 23 and the platform 24, as best shown in Figure 4. Any suitable means may be employed for adjusting the bread stop plate 54. As illustrated, a pair of transversely spaced forked brackets 55 and 56 are secured to and project upwardly from the frame member 18. Journaled in the brackets 55 and 56 are internally threaded sleeves 57 and 58. Threaded studs 59 and 60 are threaded in the sleeves 57 and 58 and to their projecting ends is secured the stop plate 54. Sprockets 61 and 62 are disposed between the forks of the brackets 55 and 56 and are secured to the sleeves 57 and 58. A sprocket chain 63 is trained over the sprockets 61 and 62. By turning a handwheel 64 which is secured to one of the sleeves 57, 58, in the present instance, the sleeve 58, both sleeves 57 and 58 are turned through the described sprocket and chain connection, whereby the threaded studs 59 and 60 are moved inwardly or outwardly carrying with them, the stop plate 54.

Tie bars 65 and 66 connect the ends of the skirt 15 with the upright frame members 28 and 29 to provide a more rigid construction. The tie bar 65 is preferably provided with an extension 67 projecting over the conveyor 23, to which extension is adjustably mounted a bread guide member 68. Side guide plates 69 and 70 are preferably mounted on the shelf 17 and the platform 24 to maintain the rows of bread in alinement as they slide forwardly and downwardly thereacross.

While the invention has been described in connection with the handling of double rows, it will be apparent that by lengthening the platform, as shown at 75 in Figure 6, to accommodate two, three or more rows of loaves, a plurality of rows can be delivered a row at a time onto the conveyor 76 to form a single continuous file.

I claim:

1. In a device of the character described, an endless conveyor movable along a horizontal path, a platform pivotally mounted adjacent one side of said conveyor adapted to receive multiple rows of products, motive means for oscillating said platform upwardly to a position sloped at an angle to permit products to slide forwardly thereacross by gravity onto said conveyor and downwardly to a position precluding such forwardly sliding movement, separate and independent motive means for operating said conveyor, and synchronous control means for the two separate and independent motive means arranged to operate said conveyor simultaneously with downward pivotal movement of said platform and to interrupt operation of said conveyor simultaneously with upward pivotal movement of said platform.

2. In a device of the character described, an endless conveyor movable along a horizontal path, a platform pivotally mounted adjacent one side of said conveyor adapted to receive a plurality of contiguous rows of articles, motive means for oscillating said platform upwardly to a position sloped at an angle to permit articles to slide in rows forwardly thereacross by gravity onto said conveyor and downwardly to a position precluding such forwardly sliding movement, separate and independent motive means for operating said conveyor, synchronous control means for the two separate and independent motive means arranged to operate said conveyor simultaneously with downward pivotal movement of said platform and to interrupt operation of said conveyor simultaneously with upward pivotal movement of said platform, and an article stop member at the side of said conveyor opposite said platform disposed to halt the advance of said contiguous rows of articles with one row wholly on said conveyor and the succeeding row wholly on said platform.

3. In a device of the character described, an endless conveyor movable along a horizontal path, a platform pivotally mounted adjacent one side of said conveyor adapted to receive multiple rows of articles, motive means for oscillating said platform about its pivotal mounting between an upwardly sloping position to permit a row of articles to slide forwardly thereacross by gravity onto said conveyor and a downwardly sloping position, separate and independent motive means for operating said conveyor, synchronous control means for the two separate and independent motive means arranged to operate said conveyor simultaneously with downward pivotal movement of said platform and to interrupt operation of said conveyor simultaneously with upward pivotal movement of said platform, and means for retaining a row of articles on said platform in its downwardly sloping position comprising an arcuate skirt adjacent the path of travel of the free edge of said pivotally mounted platform.

CARL M. VITZ.

References Cited in the file of this patent

UNITED STATES PATENTS

| Number | Name | Date |
|---|---|---|
| 620,820 | Zies | Mar. 7, 1899 |
| 2,462,021 | Harker | Feb. 15, 1949 |